Figure 1:
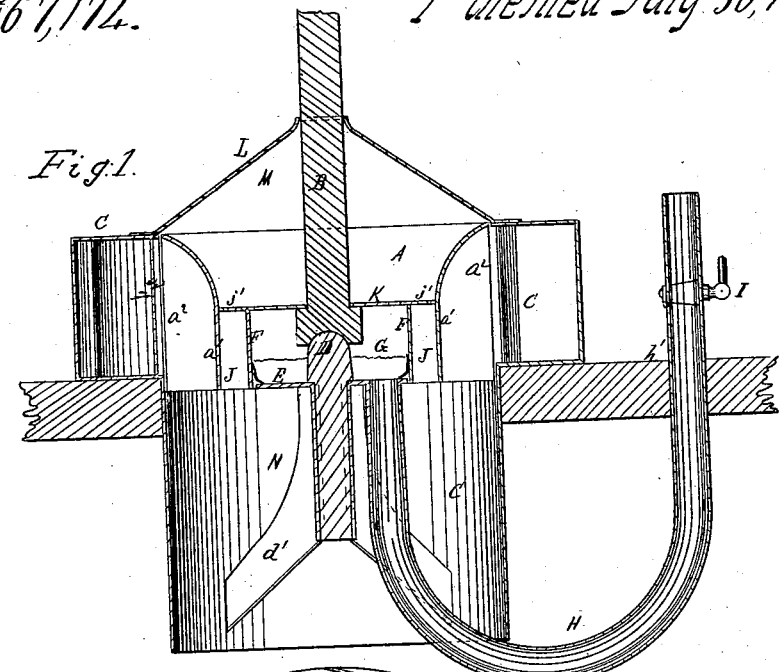
Figure 2:
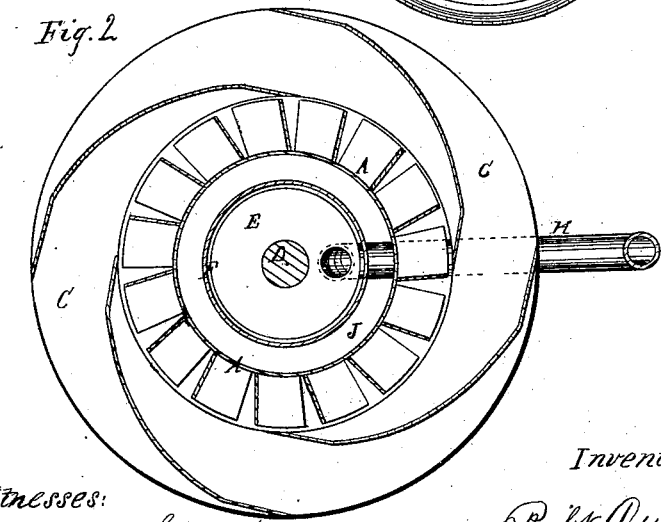

R. Dunbar,
Water Wheel.

Nº 67,174. Patented July 30, 1867.

Witnesses:
E. A. Forbush
B. H. Muchle

Inventor.
Robt Dunbar

United States Patent Office.

ROBERT DUNBAR, OF BUFFALO, NEW YORK.

Letters Patent No. 67,174, dated July 30, 1867.

IMPROVEMENT IN WATER-WHEELS.

*The Schedule referred to in these Letters Patent and making part of the same.*

TO ALL WHOM IT MAY CONCERN:

Be it known that I, ROBERT DUNBAR, of the city of Buffalo, county of Erie, and State of New York, have invented certain new and useful Improvements in Water-Wheels; and I do hereby declare that the following is a full and exact description thereof, reference being had to the accompanying drawings, making a part of this specification, in which—

Figure I is a vertical section of my improved water-wheel, and

Figure II is a horizontal section of the same.

Letters of like name and kind refer to like parts in each of the figures.

A represents a turbine water-wheel having a hub and buckets, which may be of any well-known or common construction; it is keyed to the vertical shaft B, and is placed within a wheel-case, C, of common construction. The footstep bearing of the shaft B is located within the wheel, as shown at D, being supported upon legs or flanges $d'$, which connect with the lower extension of the case or tube, as shown. Immediately below this footstep a circular horizontal disk, E, is placed and attached to the bearing in a suitable and convenient manner. F represents a rim extending or projecting from the hub or centre-plate K of the wheel downwardly, its lower end surrounding the disk E in a manner to form, in combination with said plate, a chamber, G, in which the foot-step bearing D is located or enclosed. A pipe, H, leads from the disk E, into which it opens, downwardly and around the lower case or tube, and connects to the bottom of the flume, as shown at $h'$, its other open end projecting upwardly in the flume, and being provided with a stop-cock, I. By this means a small portion of the head-water in the flume may be conveyed into the chamber G. Thus the head-water is made to raise or lift the wheel upon its foot-step bearing, preventing excessive friction and consequent wear thereof. The disk E may be provided with a packing, as shown in red lines, Fig. I, so as to retain all the water in the chamber G, or the disk may be made to fit closely to the rim F, and allow but little water to waste. By means of the stop-cock I more or less of the head-water may be admitted into the chamber G as may be desired. J represents an annular chamber, formed between the annular rim F and the main-hub rim $a^1$ and buckets $a^2$ of the wheel. It is open at the bottom and has holes $j'$ made in the hub-plate K, which is a horizontal extension of the hub, to form a connection with the shaft B. The plate K and rim $a^1$ constitute the hub. Great inconvenience has been experienced on account of water entering through the eye of the cover L of the case around the shaft, or over the top edge of the wheel and collecting upon the centre-plate thereof, adding greatly to the weight of the wheel, and allowing the whole head of water to press upon it. To avoid this difficulty this waste water is carried off through the holes $j'$ and annular chamber J without impeding or retarding the progress of the wheel. The chamber J and holes $j'$ form a communication between the chamber M, which is above the buckets of the wheel, and the chamber N, which is below the buckets, and thereby produce an equilibrium of the partial vacuum in the two chambers, which relieves such undue atmospheric pressure upon the wheel as would occur without this device.

What I claim as my invention, and desire to secure by Letters Patent, is—

1. The rim F, connected with and extending downwardly from the plate K on a circle of less diameter than the hub of the wheel, so as to form, in combination with the plate K and stationary disk E, the lesser annular chamber G, and in combination with the hub the larger annular chamber J, for the purposes and substantially as described.

2. The holes $j'$ in the plate K, opening a communication between the chambers M and N through the annular chamber J, substantially as shown and described.

ROBT. DUNBAR.

Witnesses:
 E. B. FORBUSH,
 B. H. MUEHLE.